US010399151B2

(12) United States Patent
Henry et al.

(10) Patent No.: US 10,399,151 B2
(45) Date of Patent: Sep. 3, 2019

(54) METHODS OF FORMING HOLES IN A WORKPIECE AND ASSOCIATED SYSTEMS

(71) Applicant: The Boeing Company, Chicago, IL (US)

(72) Inventors: Donald E. Henry, Garnet Valley, PA (US); Frank P. Hess, Wilmington, DE (US); Brian A. Thompson, Media, PA (US)

(73) Assignee: The Boeing Company, Chicago, IL (US)

( * ) Notice: Subject to any disclaimer, the term of this patent is extended or adjusted under 35 U.S.C. 154(b) by 284 days.

(21) Appl. No.: 15/045,840

(22) Filed: Feb. 17, 2016

(65) Prior Publication Data

US 2017/0232527 A1 Aug. 17, 2017

(51) Int. Cl.
*B23B 41/00* (2006.01)
*B23B 35/00* (2006.01)
(Continued)

(52) U.S. Cl.
CPC .............. *B23B 41/00* (2013.01); *B23B 35/00* (2013.01); *B23C 1/08* (2013.01); *B23D 77/00* (2013.01);
(Continued)

(58) Field of Classification Search
CPC ............ B23B 2220/04; B23B 2220/24; B23B 2220/44; B23B 2220/445; B23D 77/00; B23D 2277/68; Y10T 29/5107
(Continued)

(56) References Cited

U.S. PATENT DOCUMENTS 2,974,548 A 3/1961 Miller
3,739,461 A * 6/1973 Cupler, II .............. B23D 75/00 134/8

(Continued)

FOREIGN PATENT DOCUMENTS

DE 102011122539 6/2013
DE 102013224314 5/2015

(Continued)

OTHER PUBLICATIONS

Extended European Search Report for European Patent Application No. 16195079.5 dated Jul. 20, 2017.

(Continued)

*Primary Examiner* — Erica E Cadugan
*Assistant Examiner* — Michael Vitale
(74) *Attorney, Agent, or Firm* — Kunzler Bean & Adamson

(57) ABSTRACT

Described herein is a first method of forming a hole in a workpiece, having a first surface and a second surface opposite the first surface. The method includes forming a first hole, having a first diameter, in the workpiece by passing a first cutter through the workpiece from the first surface to the second surface. Additionally, the method includes forming a chamfer in the second surface of the workpiece concentric with the first hole using a second cutter. The chamfer has a second diameter larger than the first diameter. The method further includes forming a second hole, having a third diameter larger than the first diameter, in the workpiece concentric with the first hole by passing a third cutter through the workpiece from the first surface to the second surface.

13 Claims, 8 Drawing Sheets

50
Controller 56
Robot 58
Drilling Machine 52
54
100
60

300
START
302 Form pilot hole in multi-layer workpiece with first cutter
304 Is a side of multi-layer workpiece inaccessible?
Yes
No
306 Insert second cutter into pilot hole
308 Orbit second cutter about central axis of pilot hole to form concentric chamfer in inaccessible side of multi-layer workpiece
310 Enlarge pilot hole with third cutter
312 Form concentric chamfer in one accessible side of multi-layer workpiece with fourth cutter
314 Enlarge pilot hole with third cutter passing through pilot hole from another accessible side of multi-layer workpiece
END

(51) Int. Cl.
*B23D 77/00* (2006.01)
*B23C 3/12* (2006.01)
*B23C 1/08* (2006.01)

(52) U.S. Cl.
CPC ....... *B23B 2220/04* (2013.01); *B23B 2220/24* (2013.01); *B23B 2220/445* (2013.01); *B23B 2220/52* (2013.01); *B23B 2226/27* (2013.01); *B23B 2228/36* (2013.01); *B23C 2220/16* (2013.01); *B23C 2220/52* (2013.01); *B23C 2220/68* (2013.01); *B23D 2277/68* (2013.01); *Y10T 29/49996* (2015.01); *Y10T 29/5107* (2015.01); *Y10T 408/03* (2015.01); *Y10T 409/303808* (2015.01); *Y10T 409/304144* (2015.01); *Y10T 409/304424* (2015.01); *Y10T 409/307616* (2015.01)

(58) Field of Classification Search
USPC ........................................................ 29/26 A
See application file for complete search history.

(56) References Cited

U.S. PATENT DOCUMENTS 5,186,584 A * 2/1993 Muller .................... B23B 51/02 408/224
5,201,616 A * 4/1993 Alverio .................. B23D 77/00 408/224
6,665,580 B1 12/2003 Susnjara
6,761,516 B2 * 7/2004 Pham .................... B23B 35/005 408/1 R
2007/0286693 A1 * 12/2007 Cho ........................ B23B 41/14 408/227

FOREIGN PATENT DOCUMENTS

| | | | | | |
|---|---|---|---|---|---|
| EP | 0661124 | | | 7/1995 | |
| GB | 2498099 | A | * | 7/2013 | ............. B23B 35/00 |
| JP | 2000288813 | A | * | 10/2000 | |
| JP | 2007015028 | A | * | 1/2007 | |
| WO | WO 8203193 | A1 | * | 9/1982 | ........... B23B 35/005 |
| WO | 9710914 | | | 3/1997 | |

OTHER PUBLICATIONS

English translation and Russian Office Action for Russian Patent Application No. 2016138350-02(060859) dated Mar. 27, 2018.

* cited by examiner

METHODS OF FORMING HOLES IN A WORKPIECE AND ASSOCIATED SYSTEMS

FIELD

This disclosure relates generally to forming holes in workpieces, and more particularly to forming holes in workpieces having a multi-layer construction.

BACKGROUND

Drilling holes in workpieces having a multi-layer construction can have unintended consequences. For example, when drilling a hole through a workpiece having a multi-layer construction with a cutter, as the cutter exits the workpiece to complete the hole, some delamination of the layers of the workpiece adjacent the hole can occur. Delamination of layers of a workpiece can weaken the workpiece and destabilize the coupling of fasteners with the hole.

SUMMARY

The subject matter of the present application has been developed in response to the present state of the art, and in particular, in response to the shortcomings of conventional methods of drilling holes in workpieces, and associated drilling systems, that have not yet been fully solved by currently available techniques. Accordingly, the subject matter of the present application has been developed to provide methods of forming holes in workpieces, particularly those with a multi-layer construction, and associated systems, that overcome at least some of the above-discussed shortcomings of prior art techniques.

The methods and systems of the present disclosure are configured to reduce the occurrence of delamination in workpieces with a multi-layer construction during the formation of holes in the workpieces. Generally, a chamfer is formed in an exit surface of the workpiece about a pilot hole pre-formed in the workpiece. A chamfer formed in an exit surface of the workpiece can be defined as a backside chamfer. When a cutter passes through the pre-formed hole from an entry surface to the exit surface of the workpiece, to enlarge the hole, the cutter exits the workpiece through the chamfer. The characteristics of the chamfer, such as the angled or beveled surfaces of the chamfer, reduce the tendency of the layers of the workpiece to delaminate as the cutter enlarges the hole and exits the workpiece. For workpieces where the exit surface may be inaccessible for forming a backside chamfer, such as when the exit surface is enclosed, some embodiments of the methods and systems of the present disclosure facilitate the formation of backside chamfers in exit surfaces that are inaccessible.

According to one embodiment, a first method of forming a hole in a workpiece, having a first surface and a second surface opposite the first surface, is disclosed. The method includes forming a first hole, having a first diameter, in the workpiece by passing a first cutter through the workpiece from the first surface to the second surface. Additionally, the method includes forming a chamfer in the second surface of the workpiece concentric with the first hole using a second cutter. The chamfer has a second diameter larger than the first diameter. The method further includes forming a second hole, having a third diameter larger than the first diameter, in the workpiece concentric with the first hole by passing a third cutter through the workpiece from the first surface to the second surface.

In some implementations of the first method, forming the chamfer in the second surface of the workpiece includes inserting the second cutter into the first hole from the first surface of the workpiece to the second surface of the workpiece. Forming the chamfer in the second surface of the workpiece can further include, with the second cutter inserted into the first hole, orbiting the second cutter about a central axis of the first hole while cutting the workpiece. The first method may additionally include numerically controlling operation of the second cutter to form the chamfer in the second surface of the workpiece. The second cutter can include a dovetail cutter. The dovetail cutter has a maximum cutting diameter smaller than the first diameter of the first hole.

According to certain implementations of the first method, forming the chamfer in the second surface of the workpiece includes positioning the second cutter on a second side of the workpiece adjacent the second surface, inserting a pilot portion of the second cutter into the first hole in a direction extending from the second side of the workpiece to a first side of the workpiece adjacent the first surface, and cutting the second surface of the workpiece with the second cutter and with the pilot portion of the second cutter inserted into the first hole. The first method can further include preventing further insertion of the pilot portion of the second cutter into the first hole in the direction extending from the second side of the workpiece to the first side of the workpiece beyond a predetermined distance threshold. The predetermined distance threshold may correspond with a predetermined desired depth of the chamfer.

In one implementation of the first method, the first cutter includes one of a fluted drill bit or a first reamer and the third cutter includes a second reamer.

According to certain implementations of the first method, the second diameter of the chamfer is a maximum diameter of the chamfer. Additionally, the second diameter of the chamfer can be smaller than the third diameter of the second hole.

In certain implementations of the first method, the second diameter of the chamfer is larger than the third diameter of the second hole.

According to some implementations of the first method, the workpiece includes a plurality of interlaminated layers.

In yet another embodiment, a second method of forming a hole in a multi-layer composite workpiece is disclosed. The multi-layer composite workpiece has a first surface and a second surface opposite the first surface. The second method includes forming a pilot hole in the multi-layer composite workpiece. The pilot hole extends from the first surface to the second surface. Additionally, the second method includes forming a chamfer, concentric with the pilot hole, in the second surface of the multi-layer composite workpiece. The second method further includes, with the chamfer formed in the second surface of the multi-layer composite workpiece, enlarging the pilot hole.

According to certain implementations of the second method, the second surface of the multi-layer composite workpiece is substantially enclosed such that the second surface is inaccessible from a second space directly adjacent the second surface of the multi-layer composite workpiece. Forming the chamfer in the second surface of the multi-layer composite workpiece can include inserting a second cutter into the pilot hole from a first space directly adjacent the first surface of the multi-layer composite workpiece, and orbiting the second cutter about a central axis of the pilot hole while cutting the second surface of the multi-layer composite workpiece. Enlarging the pilot hole can include passing a third cutter through the pilot hole and the chamfer from the first space directly adjacent the first surface of the multi-layer composite workpiece.

In some implementations of the second method, forming the chamfer in the second surface of the multi-layer composite workpiece includes inserting a fourth cutter into the pilot hole from a second space directly adjacent the second surface of the multi-layer composite workpiece. Additionally, enlarging the pilot hole can include passing a third cutter through the pilot hole and the chamfer from a first space directly adjacent the first surface of the multi-layer composite workpiece.

According to certain implementations of the second method, enlarging the pilot hole includes enlarging the pilot hole to a fourth diameter less than a maximum diameter of the chamfer.

In some implementations of the second method, enlarging the pilot hole comprises enlarging the pilot hole to a fourth diameter more than a maximum diameter of the chamfer.

According to another embodiment, a system for forming a hole in a workpiece is disclosed. The workpieces has a first surface and a second surface opposite the first surface. The system includes a first cutter, configured to cut a cylindrical hole having a first diameter, a second cutter, configured to cut a chamfer, a third cutter, configured to cut a cylindrical hole having a second diameter that is larger than the first diameter, and a controller. The controller is configured to cause the first cutter to cut a first hole, having the first diameter, through the workpiece, to cause the second cutter to cut a chamfer in the second surface of the workpiece concentric with the first hole, and to cause the third cutter to enlarge the first hole from the first diameter to the second diameter by passing the third cutter through the workpiece in a direction extending from the first surface of the workpiece to the second surface of the workpiece.

In some implementations of the system, the second cutter has a maximum cutting diameter smaller than the first diameter. Additionally, the controller can cause the second cutter to cut the chamfer in the second surface of the workpiece by inserting the second cutter into the first hole in a direction extending from the first surface of the workpiece to the second surface of the workpiece and, with the second cutter inserted into the first hole, orbiting the second cutter about a central axis of the first hole while cutting the second surface of the workpiece.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
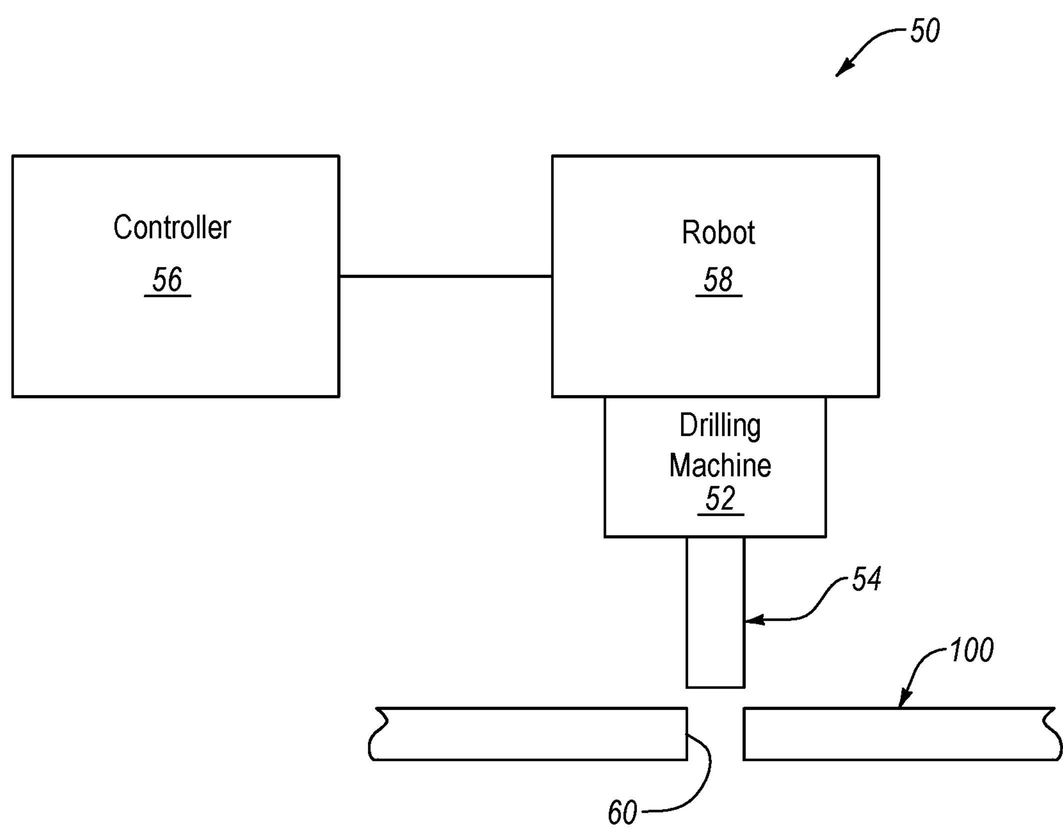
FIG. 1 is a schematic block diagram of a system for forming a hole in a workpiece, according to one or more embodiments of the present disclosure.

Referring to FIG. 1, according to one embodiment, a system 50 for forming a hole 60 in a workpiece 100 is shown schematically. Generally, the system 50 includes a drilling machine 52, a cutter 54, a controller 56, and a robot 58. The cutter is rotatably coupled to the drilling machine 52, which is configured to rotate the cutter 54 about a central axis. Although not shown, the drilling machine 52 may include a spindle or motor configured to rotatably drive the cutter 54, which can be co-rotatably coupled with the motor via a chuck. The spindle or motor can include any of various types of motors, such as electric motors, electromagnetic motors, pneumatic motors, hydraulic motors, and the like. As the cutter 54 is rotated, the drilling machine 52 is moved relative to the workpiece 100, such as along a feed axis parallel to the central axis of the cutter 54 or a feed axis perpendicular to the central axis of the cutter 54, to pass the cutter 54, at least partially, through the workpiece 100 to form the hole 60 in the workpiece. As defined herein, a hole is a through-hole that extends entirely through the workpiece and has an entry opening on a first surface (e.g., entry surface) of the workpiece 100 and an exit opening on a second surface (e.g., exit surface) of the workpiece, opposing the first surface. In some embodiments, the drilling machine 52 is a punching machine and the cutter 54 is a punch tool that is punched through the workpiece by the punching machine to form the hole in the workpiece. Accordingly, as used herein, a cutter can be a rotatable drill bit or a non-rotatable punch tool, and forming a hole in a workpiece can be done by drilling the workpiece with a cutter or punching the workpiece with a cutter.

The controller 56, or control module, is operably coupled with the drilling machine 42 to numerically control operation of the drilling machine 42. For example, the controller 56 may include programmable logic that causes commands and power to be transmitted to the drilling machine 52 to control the operating characteristics of the drilling machine 42 and the cutter 54. In one implementation, the controller 56 transmits commands and power to the drilling machine 42 to achieve a desired rotational speed of the cutter 54. The controller 56 can vary the commands and power to vary the rotational speed of the cutter 54, such as in response to the type of cutter being used, the type of material being cut, and/or the type of cut being made to the workpiece.

Additionally, the controller 56 may be configured to numerically control movement of the drilling machine 42 and cutter 54 relative to the workpiece 100 via a robot 58. Generally, in some implementations, although not shown, the robot 58 includes an arm and an end effector, to which the drilling machine 52 is fixed. The programmable logic of the controller 56 is configurable to command the robot 58 to move the drilling machine 52, relative to the workpiece 100, as necessary to form the hole 60 in the workpiece 100. The robot 58 can be configured to move the drilling machine 52 and cutter 54 along any number of feed axes to form holes in the workpiece having any number of shapes and sizes. Moreover, the robot 58 may be configured to position the drilling machine 52 and cutter 54 on opposing sides or surfaces of the workpiece 100 to approach the workpiece 100, in a hole-forming operation, from either surface of the workpiece 100.

In some implementations, the cutter 54 of the system 50 represents any one of multiple cutters of the system 50. For example, the system can include multiple cutters 54 that are interchangeably coupleable with the drilling machine 52 to cut the workpiece 100 in different ways during a hole-forming operation. Examples of the multiple cutters 54 and associated steps executed during a hole-forming operation are described in more detail below. In other words, the system 50 can include any of the cutters described herein and perform any of the hole-forming steps described herein to form a hole in a workpiece.

Figure 2:
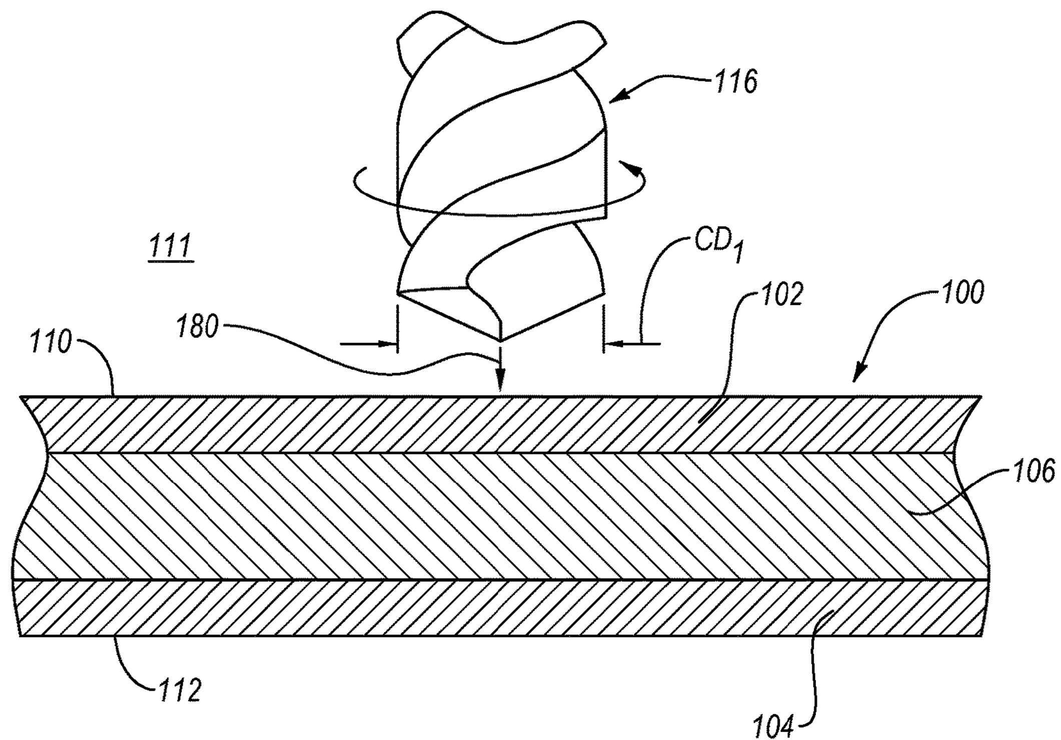
FIG. 2 is a partial cross-sectional side elevation view of a first cutter in position to form a first hole in a workpiece, according to one or more embodiments of the present disclosure.

Referring now to FIG. 2, a first cutter 116 is shown positioned to form a hole in the workpiece 100. The workpiece 100 includes a first surface 110 and a second surface 112, opposing the first surface 110. A thickness of the workpiece 100 is defined between the first surface 110 and the second surface 112. Although not necessary, the workpiece 100 can have a thickness that is relatively smaller than a length or width of the workpiece 100, such that the workpiece 100 formed a thin-walled panel. Although the workpiece 100 is shown to have first and second surfaces 110, 112 that are flat, in other embodiments, the workpiece 100 may be contoured, such that the first and second surfaces 110, 112 are non-flat, such as round, curved, bent, jagged, or otherwise. The workpiece 100 may form a portion of an overall structure, such as a rotor blade of a helicopter or a body of an airplane.

During manufacturing of the structure, a first space 111 is defined directly adjacent the first surface 110 and a second space 113 is defined directly adjacent the second surface 113. In other words, the workpiece 100 divides the first space 111 from the second space 113. Depending on the shape of the structure, the first space 111 may be an open or accessible space for users to access the first surface 110 from the first space 111. Likewise, such as for flat-paneled structures, the second space 113 may be an open or accessible space for users to access the second surface 112 from the second space 113. However, for certain structures, such as substantially circumferentially enclosed or tubular structures, like a rotor blade, the second space 113 may be an enclosed or inaccessible space, such that a user would be unable to access the second surface 112 from the second space 113 because it is facing an interior of the enclosed space.

The workpiece 100 can be made from any of various materials, such as metals, plastics, fiber-reinforced composites, and the like. Moreover, the workpiece 100 can include a single layer of material or multiple layers of the same or different materials.

As shown in FIG. 2, the workpiece 100 includes multiple layers of material or is multi-layered. The layers of the workpiece 100 can be laminated (e.g., interlaminated layers) or bonded together to form the workpiece. As an example, the workpiece 100, in the illustrated embodiments of FIGS. 2-12, includes a first layer 102, a second layer 104, and a third layer 106 interposed between the first and second layers 102, 104. The first layer 102, second layer 104, and third layer 106 are affixed, bonded, or laminated to each other to form a laminated, multi-layered workpiece. Although the workpiece 100, in the illustrated embodiments of FIGS. 2-12, includes three layers, in other embodiments, the workpiece 100 can include two or more than three layers.

According to one implementation, each of the first layer 102, second layer 104, and third layer 106 is made from a fiber-reinforced composite material that includes fibers, such as carbon fibers, suspended within an epoxy matrix. Such workpieces can be defined as a multi-layer composite workpiece. The fibers of the fiber-reinforced composite materials may be unidirectional, with the direction of the fibers of at least two of the first layer 102, second layer 104, and third layer 106 being different. For example, in one implementation, the unidirectional fibers of the first layer 102 are oriented in a direction different than the unidirectional fibers of the second layer 104 and third layer 106, and the unidirectional fibers of the second layer 104 are oriented in a direction different that the unidirectional fibers of the third layer 106. In one implementation, the third layer 106 is made from a non-composite material, such as a foam.

Referring still to FIG. 2, the first cutter 116 can be any of various cutters (e.g., drill bits) configured to cut holes, of any of various shapes and sizes, in materials. In one implementation, the first cutter 116 is a twist or fluted drill bit with a relatively high flute twist rate. Alternatively, the first cutter 116 can be a fluted reamer with a relatively low twist rate or a non-fluted reamer (see, e.g., FIG. 7). In the illustrated embodiment, the first cutter 116 is configured to cut a first hole 120 having a first diameter $D_1$ that is constant along a central axis 121 of the first hole 120 (see, e.g., FIG. 3). In other words, the first hole 120 is a substantially cylindrical hole with parallel sidewalls. To form (e.g., cut) the first hole 120 with the first diameter $D_1$, the first cutter 116 has a first cutting diameter $CD_1$ approximately equal to, or slightly smaller than, the first diameter $D_1$ of the first hole 120. The first hole 120 is configured to act as a pilot hole for further working of the workpiece.

Figure 3:
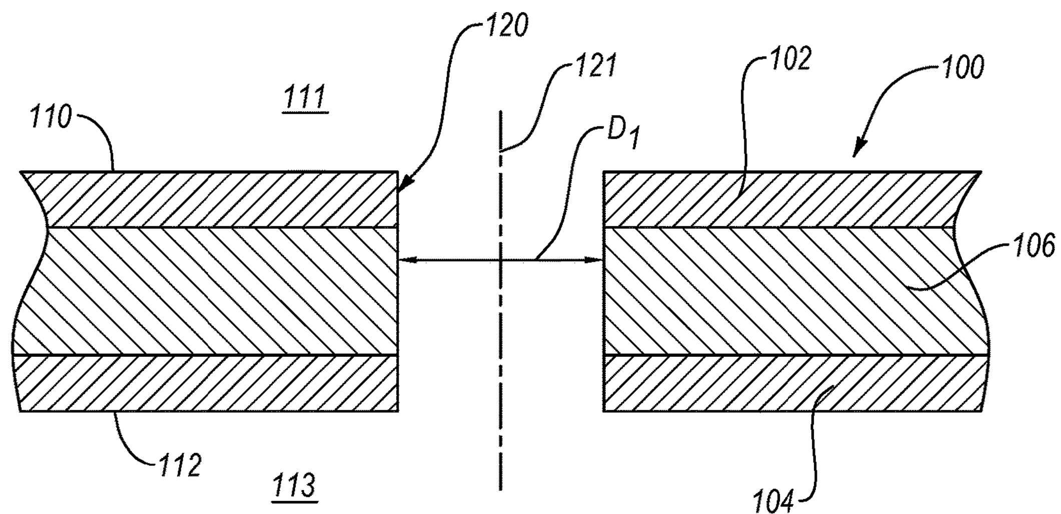
FIG. 3 is a cross-sectional side elevation view of a first hole formed in the workpiece by the first cutter of FIG. 2, according to one or more embodiments of the present disclosure.

While rotating about its central axis, as indicated by a rotational direction arrow in FIG. 2, the first cutter 116 is fed from the first space 111 in a first feed direction 180, parallel to the central axis 121 of the first hole 120 to be formed and, in some implementations, perpendicular to the first surface 110 of the workpiece 100, to pass through the workpiece 100. As the first cutter 116 rotates and passes through the workpiece 100, the first cutter 116 cuts away the material of the workpiece 100 to form the first hole 120, as shown in FIG. 3. In one implementation, a portion of the first cutter 116 extends through and at least partially beyond the second surface 112 of the workpiece 100, such that the first hole 120 extends entirely through the workpiece 100 from the first surface 110 to the second surface 112.

Figure 4:
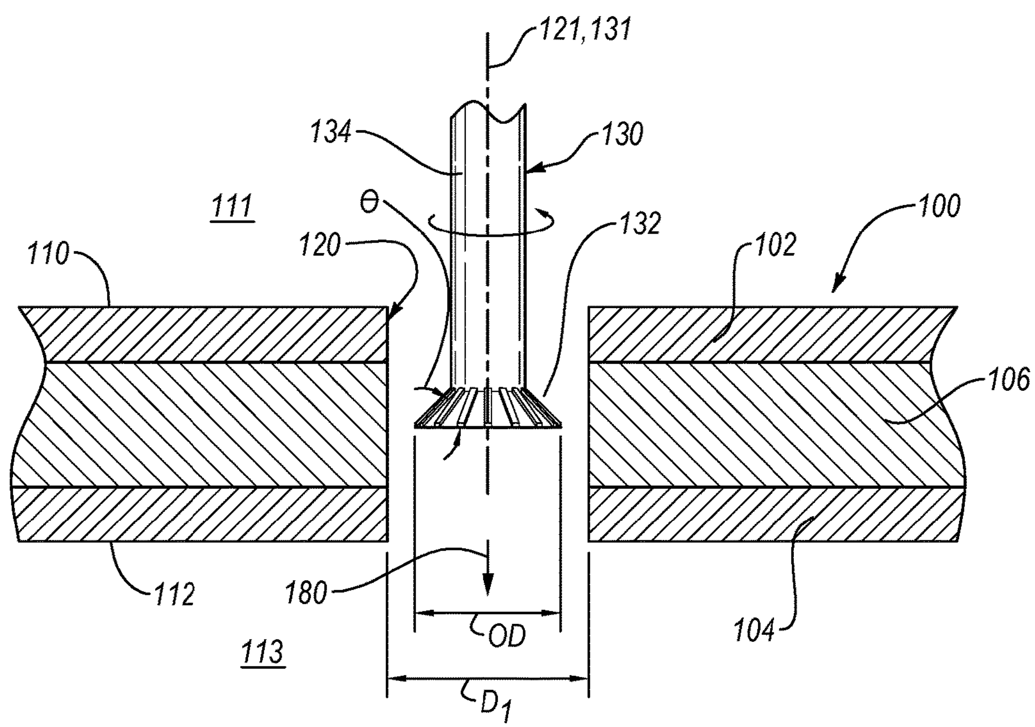
FIG. 4 is a partial cross-sectional side elevation view of a second cutter inserted into the first hole formed in the workpiece, according to one or more embodiments of the present disclosure.
Figure 5:
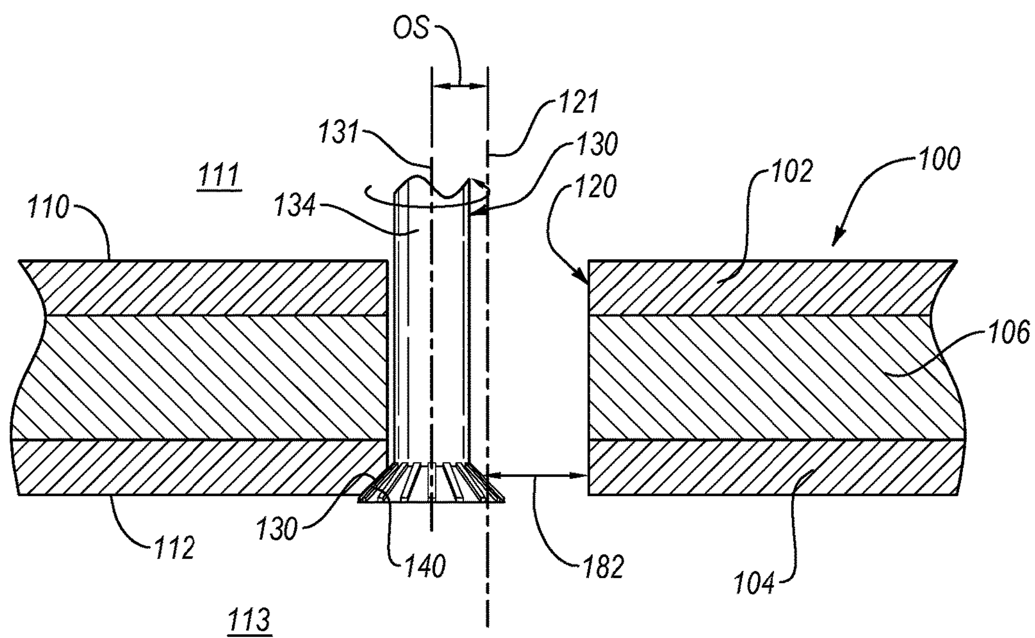
FIG. 5 is a partial cross-sectional side elevation view of the second cutter forming a chamfer in the workpiece, according to one or more embodiments of the present disclosure.

In the embodiment of FIGS. 4 and 5, the second surface 112 of the workpiece 100 is inaccessible from the second space 113 as defined above (although the same embodiment can be applied when the second surface 112 of the workpiece 100 is accessible from the second space 113). Accordingly, the workpiece 100 cannot be approached from the second space 113 to form a chamfer 142 (see, e.g., FIG. 6) in the second surface 112 of the workpiece 100. Therefore, a second cutter 130, approaching the workpiece 100 from the first space 111, is used to form the chamfer 142 in the second surface 112. The second cutter 130 can be any of various cutters configured to cut chamfers in materials. In one implementation, the second cutter 130 is a dovetail cutter specifically configured to cut chamfers in a backside of a workpiece. Therefore, the second cutter 130 can include one or more cutting edges 132 or blades that are angled at an angle θ relative to a plane perpendicular to the central axis 121 of the first hole 120 and a central axis 131 of the second cutter 130. Moreover, the second cutter 130 is configured such that the cutting edges 132 face back towards a shank 134 of the second cutter 130. The cutting edges 132 of the second cutter 130 define a maximum cutting diameter, which can be equal to a maximum outer diameter OD of the second cutter 130. The maximum outer diameter OD of the second cutter 130 is smaller than the first diameter $D_1$ of the first hole 120.

Referring to FIG. 4, with the second space 113 being inaccessible, the second cutter 130 is fed from the first space 111 in the first feed direction 180 into and, and at least partially through, the first hole 120. Generally, the second cutter 130 is fed through the first hole 120 until the second cutter 130 reaches a desired cutting position relative to the second surface 112 of the workpiece 100. The desired cutting position can be any position in which at least some portion of the cutting edges 132 of the second cutter 130 are laterally adjacent the second surface 112, or extend beyond the second surface 112 in the first feed direction 180. Because the maximum outer diameter OD of the second cutter 130 is smaller than the first diameter $D_1$ of the first hole 120, the second cutter 130 can be inserted into and fed along the first hole 120 without the second cutter 130 impacting the workpiece 100. For example, the second cutter 130 can be fed through the first hole 120 in the first feed direction 180 with the central axis 131 of the second cutter 130 being concentric with the central axis 121 of the first hole 120 as shown in FIG. 2. As used herein, a central axis of an object is a longitudinal symmetry axis of the object. While the second cutter 130 is fed through the first hole 120, the second cutter 130 need not be rotating, but can be rotating in some implementations.

After the second cutter 130 is fed into the desired cutting position, the second cutter 130 is rotated about its central axis 131 (if not already rotating) as indicated by rotational direction arrow in FIG. 5. Referring still to FIG. 5, the second cutter 130 is then moved laterally as indicated by directional arrows 182 until cutting edges 132 pass through the workpiece 100 along the second surface 112 of the workpiece 100 to cut away the material to form the chamfer 142. Generally, the chamfer 142 is formed by cutting an angled surface 140 of a desired depth into the second surface 112 of the workpiece 100 concentrically about the central axis 121 of the first hole 120. The angle of the angled surface 140 corresponds with the angle of the cutting edges 132 of the second cutter 130. The angled surface 140 faces away from the shank 134 of the second cutter 130 when the second cutter 130 is positioned within the first hole 120 as shown.

According to one embodiment, because the maximum cutting diameter is smaller than the first diameter $D_1$ of the first hole 120, the chamfer 142 is formed by the second cutter 130 using orbital drilling techniques. Generally, orbital drilling techniques include offsetting the central axis 131 of the second cutter 130 from the central axis 121 of the first hole 120 by an offset OS, associated with a position of the second cutter 130 that cuts the angled surface 140 to a desired depth. Then, while the second cutter 130 is rotating about its central axis 131 to cut material from the second surface 112, orbiting the second cutter 130 and the central axis 131 about the central axis 121 of the first hole 120. In this manner, the chamfer 142 concentric with the first hole 120 and having a desired depth dc is formed in the second surface 112 of the workpiece 100.

Figure 6:
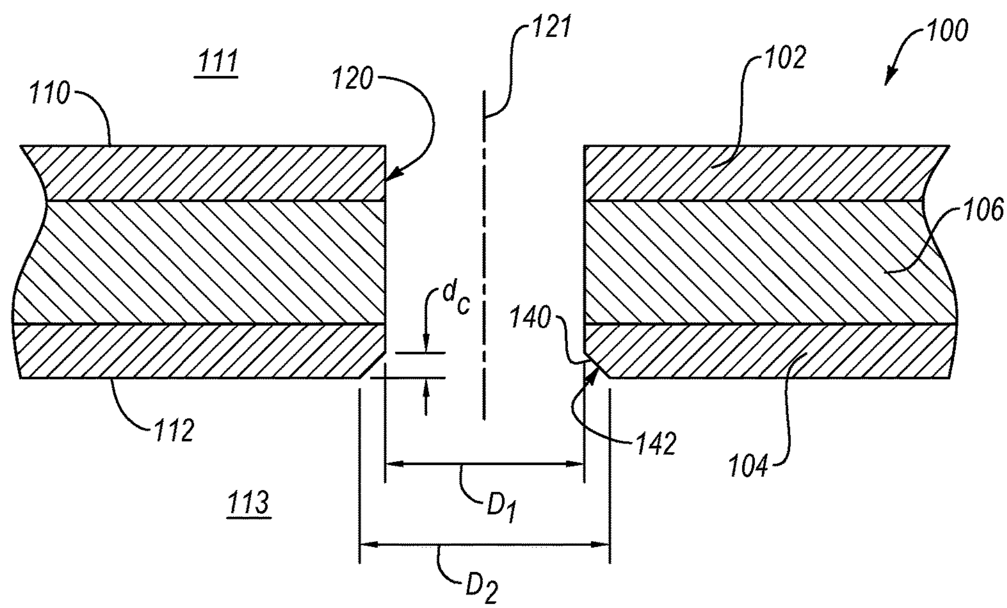
FIG. 6 is a cross-sectional side elevation view of the first hole and a chamfer formed in the workpiece by the second cutter of FIG. 5, according to one or more embodiments of the present disclosure.

Referring to FIG. 6, the chamfer 142 has an increasing diameter in the first feed direction 180 from a minimum diameter equal to the diameter $D_1$ of the first hole 120 to a maximum diameter $D_2$ flush or coincident with the second surface 112 of the workpiece 100. Because, the diameter of the chamfer 142 is larger than the diameter $D_1$ of the first hole 120 at all points along the central axis 121, excluding the minimum diameter, the chamfer 142 is defined to have a diameter that is larger than the diameter $D_1$ of the first hole 120. Further, although the chamfer 142 is shown to be formed in only the second layer 104 of the workpiece 100, in some embodiments, the chamfer 142 is formed in multiple layers of the workpiece 100.

Figure 7:
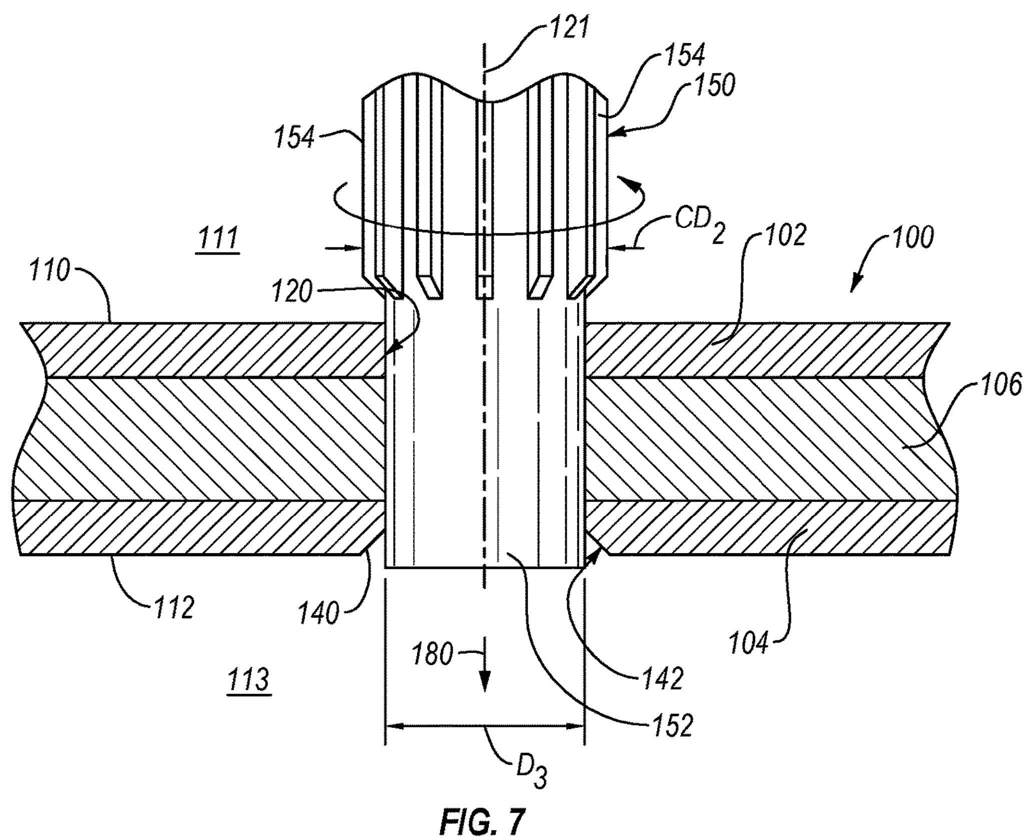
FIG. 7 is a partial cross-sectional side elevation view of a third cutter with a pilot portion inserted into the first hole formed in the workpiece, according to one or more embodiments of the present disclosure.

As shown in FIG. 7, after forming the chamfer 142 in the second surface 112 of the workpiece 100, a third cutter 150 is used to form a second hole 160 by enlarging the first hole 120. The third cutter 150 can be any of various cutters configured to enlarge previously cut holes. In one implementation, the third cutter 150 is a reamer, such as a drill bit with a relatively low twist rate or a non-fluted drill bit. For example, as illustrated, the third cutter 150 is a non-fluted drill bit with a plurality of parallel cutting blades 154 positioned circumferentially about a central shank. Each cutting blade 154 has a cutting edge configured to cut material as the third cutter 150 is rotated. The cutting blades 154 define a second cutting diameter $CD_2$. In the illustrated embodiment, the third cutter 150 is configured to cut a second hole 160 (see, e.g., FIGS. 8 and 9) having a fourth diameter $D_4$ that is constant along a central axis 161 of the second hole 160. In other words, the second hole 160 is a substantially cylindrical hole with parallel sidewalls. To form (e.g., cut) the second hole 160 with the fourth diameter $D_4$, the second cutting diameter $D_2$ of the third cutter 150 is approximately equal to, or slightly smaller than, the fourth diameter $D_4$ of the second hole 160.

Figure 8:
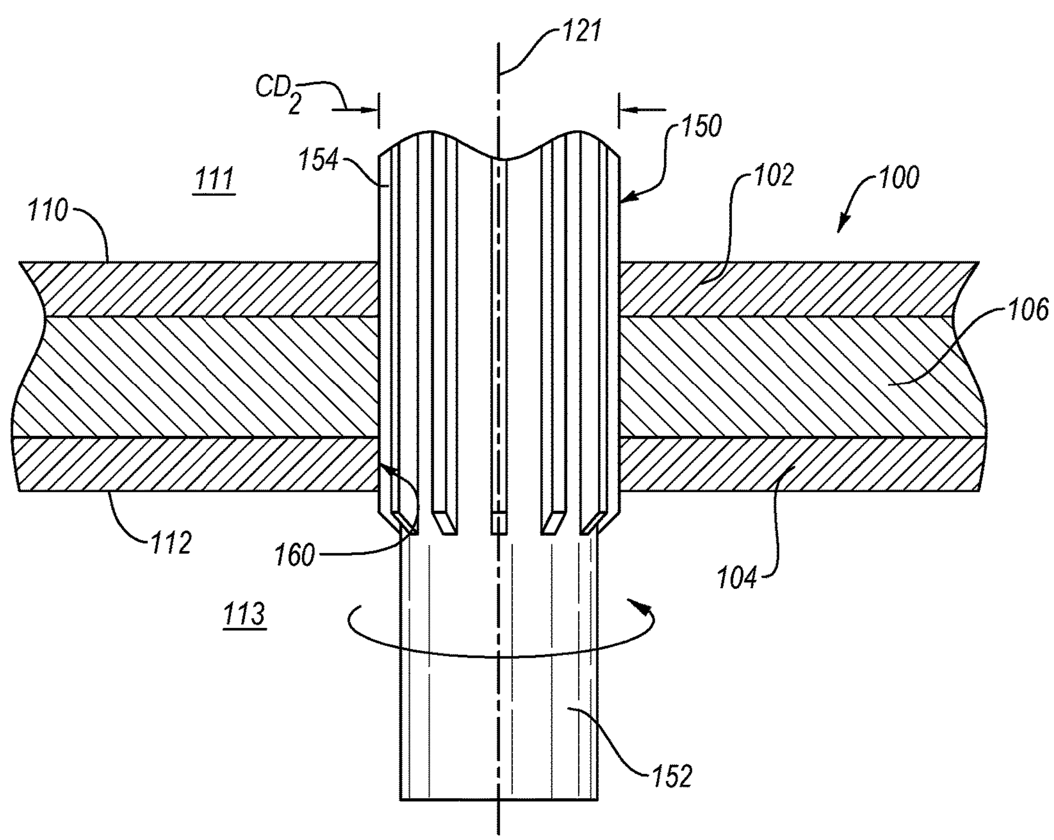
FIG. 8 is a partial cross-sectional side elevation view of the third cutter enlarging the first hole to form a second hole in the workpiece, according to one or more embodiments of the present disclosure.

While rotating about its central axis, as indicated by a rotational direction arrow in FIGS. 7 and 8, the third cutter 150 is fed from the first space 111 in the first feed direction 180 concentric with the central axis 121 of the first hole 120 to pass through the workpiece 100. As the third cutter 150 rotates and passes through the workpiece 100, the third cutter 150 cuts away material of the workpiece 100 circumferentially surrounding the first hole 120 to effectively enlarge the first hole 120 by forming the second hole 160, concentric with the first hole 120, having the fourth diameter $D_4$ larger than the first diameter $D_1$. In one implementation, a portion of the third cutter 150 extends through and at least partially beyond the second surface 112 of the workpiece 100, such that the second hole 160 extends entirely through the workpiece 100 from the first surface 110 to the second surface 112.

In some embodiments, to facilitate concentricity between a central axis of the third cutter 150 and the central axis 121 of the first hole 120 as the third cutter 150 is fed through the first hole 120 to form the second hole 160, the third cutter 150 includes a pilot portion 152. The pilot portion 152 is configured to complement the first hole 120 or form a clearance fit (e.g., allow relative rotation) with the first hole 120. Accordingly, the pilot portion 152 of the third cutter 150 is substantially cylindrically shaped and has a third diameter $D_3$ substantially equal to the first diameter $D_1$ of the first hole 120. Generally, engagement between pilot portion 152 of third cutter 150 and the first hole 120 ensures a proper concentric orientation of the third cutter 150 relative to the first hole 120 before the third cutter 150 starts to cut material away from the workpiece 100.

Figure 9:
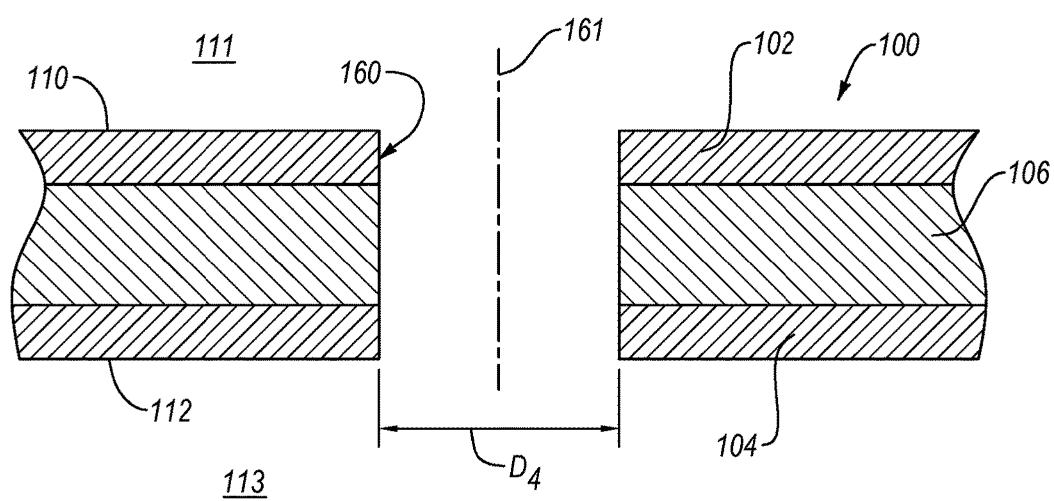
FIG. 9 is a cross-sectional side elevation view of the second hole formed in the workpiece by the third cutter of FIG. 8, according to one or more embodiments of the present disclosure.

In the illustrated embodiment of FIGS. 7-9, the second cutting diameter $CD_2$ of the third cutter 150, and thus the fourth diameter $D_4$ of the second hole 160, is larger than the maximum diameter $D_2$ of the chamfer 142 such that no portion of the chamfer 142 remains after forming the second hole 160. In such an embodiment, and for a given final hole diameter (e.g., 0.75 inches), a ratio between the maximum diameter $D_2$ of the chamfer 142 and the first diameter $D_1$ of the first hole 120 is between about 1 and about 1.2, a ratio between the maximum diameter $D_2$ of the chamfer 142 and the fourth diameter $D_4$ of the second hole 160 is between about 0.99 and about 1, and a ratio between the first diameter $D_1$ of the first hole 120 and the fourth diameter $D_4$ of the second hole 160 is greater than about 0.83 and less than about 1.

Figure 10:
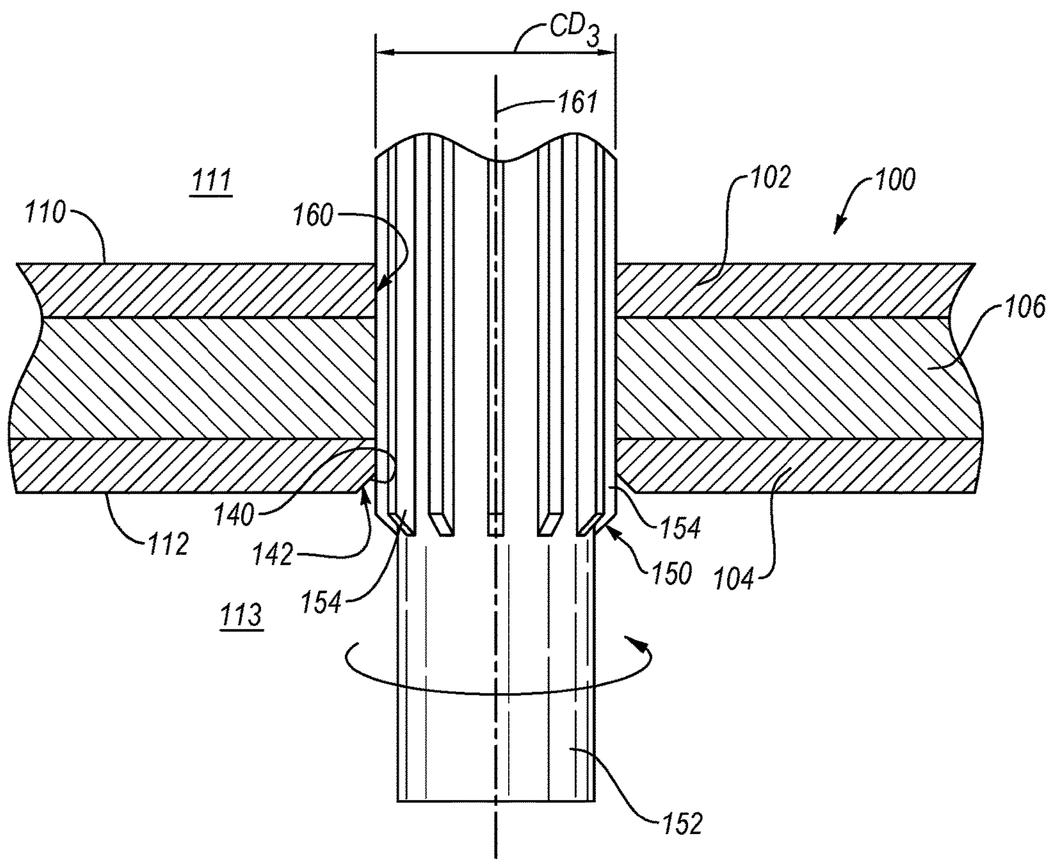
FIG. 10 is a partial cross-sectional side elevation view of a third cutter enlarging the first hole to form a second hole in the workpiece, according to one or more embodiments of the present disclosure.
Figure 11:
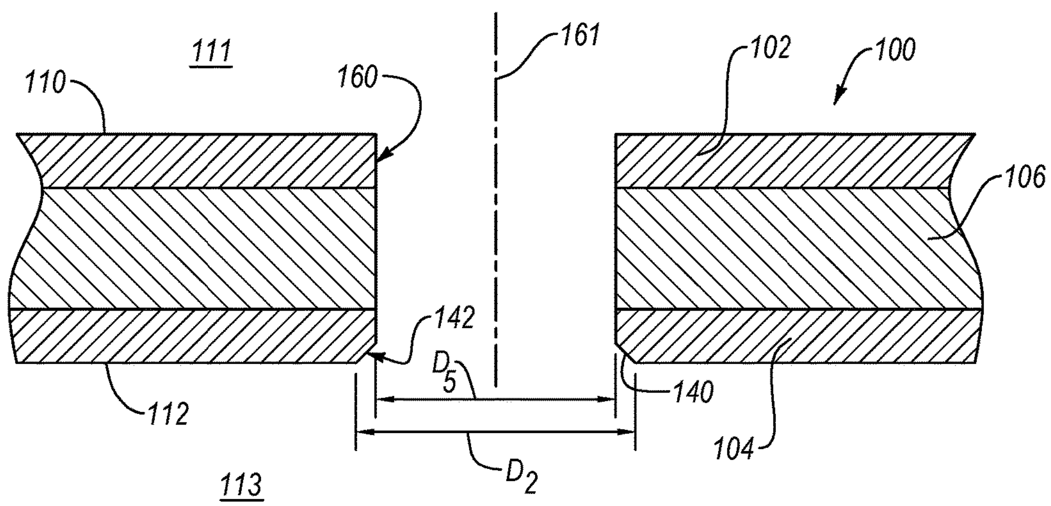
FIG. 11 is a cross-sectional side elevation view of the second hole formed in the workpiece by the third cutter of FIG. 10, according to one or more embodiments of the present disclosure.

In contrast to the embodiment of FIGS. 7-9, in the embodiment of FIGS. 10 and 11, the third cutter 150 has a third cutting diameter $CD_3$, smaller than the second cutting diameter $CD_2$ and smaller than the maximum diameter $D_2$ of the chamfer 142, such that a portion of the chamfer 142 remains after forming the second hole 160 with a fifth diameter $D_5$ substantially equal to the third cutting diameter $CD_3$. In the illustrated embodiment of FIGS. 10 and 11, and for a given final hole diameter (e.g., 0.75 inches), a ratio between the maximum diameter $D_2$ of the chamfer 142 and the first diameter $D_1$ of the first hole 120 is between about 1 and about 1.2, a ratio between the maximum diameter $D_2$ of the chamfer 142 and the fifth diameter $D_5$ of the second hole 160 is between about 1.01 and about 1, and a ratio between the first diameter $D_1$ of the first hole 120 and the fifth diameter $D_5$ of the second hole 160 is greater than about 0.83 and less than about 1.

Figure 12:
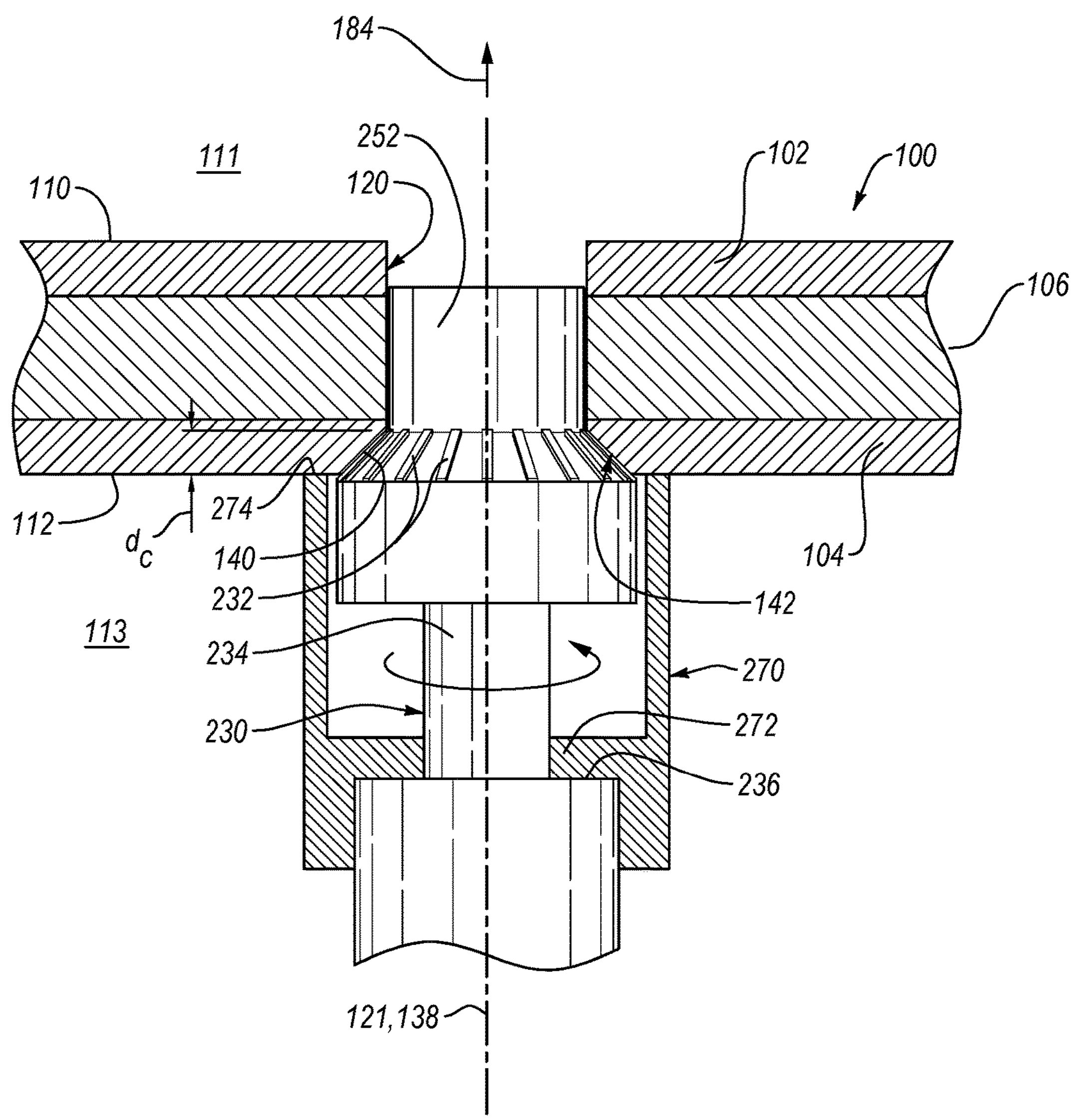
FIG. 12 is a partial cross-sectional side elevation view of a fourth cutter forming a chamfer in the workpiece, according to one or more embodiments of the present disclosure.

While the embodiment of FIGS. 4 and 5 is specifically configured to accommodate structures where the second surface 112 of the workpiece 100 is inaccessible from the second space 113, the embodiment of FIG. 12 is associated with a structure where the second surface 112 of the workpiece 100 is accessible from the second space 113. In other words, in the embodiment of FIG. 12, the workpiece 100 can be approached from the second space 113 to form the chamfer 142 in the second surface 112 of the workpiece 100. Therefore, a fourth cutter 230, approaching the second surface 112 workpiece 100 from the second space 113, is used to form the chamfer 142 in the second surface 112.

The fourth cutter 230 can be any of various cutters configured to cut chamfers in materials. In one implementation, the fourth cutter 230 is a reverse dovetail cutter. The fourth cutter 230 includes one or more cutting edges 232 or blades that are angled at an angle relative to a plane perpendicular to the central axis 121 of the first hole 120 and a central axis 131 of the second cutter 130. Contrary to the second cutter 130, the fourth cutter 230 is configured such that the cutting edges 232 face away from a shank 234 of the fourth cutter 230. The cutting edges 232 of the fourth cutter 230 also define a maximum cutting diameter, which can be equal to a maximum outer diameter OD of the fourth cutter 230. The maximum cutting diameter of the fourth cutter 230 corresponds with a maximum diameter of the chamfer 142 that can be formed by the fourth cutter 230. Moreover, in the illustrated embodiment, the maximum outer diameter OD of the fourth cutter 230 is larger than the first diameter $D_1$ of the first hole 120. However, in some embodiments, the maximum outer diameter OD of the fourth cutter 230 can be smaller than the first diameter $D_1$ of the first hole 120, and the chamfer 142 can be cut using orbital drilling techniques as described above.

Referring still to FIG. 12, with the second surface 112 of the workpiece 100 being accessible via the second space 113, the fourth cutter 230 is rotated, as indicated by rotational direction arrow, and fed from the second space 113 in a second feed direction 184, opposite the first feed direction 180, into the second surface 112 of the workpiece 100 to form the chamfer 142 in the second surface 112 concentric with the first hole 120. Generally, the fourth cutter 230 is fed into the second surface 112 of the workpiece 100 until the fourth cutter 230 reaches a desired depth into the workpiece 100 associated with a desired depth dc of the chamfer 142, which can be predetermined. In one embodiment, movement of the fourth cutter 230 is numerically controlled to stop feeding the fourth cutter 230 into the workpiece 100 once the fourth cutter 230 reaches a predetermined distance threshold and the desired depth dc of the chamfer 142 is reached. However, in other embodiments, movement of the fourth cutter 230 is manually controlled.

When movement of the fourth cutter 230 is manually controlled, a micro-stop 270 can be used ensure the fourth cutter 230 does not exceed the desired depth dc of the chamfer 142 as it is being manually fed into the workpiece 100 in the second feed direction 184. The micro-stop 270 can be any of various micro-stops known in the art. For example, in one implementation, the micro-stop 270 is movably coupled with the fourth cutter 230 to allow the fourth cutter 230 to move through the micro-stop 270 as the fourth cutter 230 is being fed in the second feed direction 184. However, the micro-stop 270 includes a ridge 272 or stop that is configured to engage a shoulder 236 of the fourth cutter 230 to prevent further movement of the fourth cutter 230 relative to the micro-stop 270 in the second feed direction 184 when the desired depth dc of the chamfer 142 is reached. The micro-stop 270 includes an end 274 designed to abut the second surface 112 of the workpiece 100 around the first hole 120 while the chamfer 142 is being formed, such that engagement with the ridge 272 by the shoulder 236 not only prevents further movement of the fourth cutter 230 relative to the micro-stop 270 in the second feed direction 184, but also prevents further movement of the fourth cutter 230 relative to the workpiece 100 in the second feed direction 184. A distance between the ridge 272 and an end of the micro-stop 270 abutting the second surface 112 is set to correspond with the desired depth dc of the chamfer 142. In certain implementations, the distance between the ridge 272 and the end 274 of the micro-stop 270 abutting the second surface 112 is adjustable to accommodate different desired depths dc of the chamfer 142.

Because orbital drilling techniques are not necessary when the second surface 112 of the workpiece 100 is accessible via the second space 113, as mentioned above, the chamfer 142 can be manually formed in the second surface 112 with the fourth cutter 230. To facilitate concentricity between a central axis 238 of the fourth cutter 230 and the central axis 121 of the first hole 120 as the fourth cutter 230 forms the chamfer 142, the fourth cutter 230 may include a pilot portion 252. Similar to the pilot portion 152 of the third cutter 150, the pilot portion 252 of the fourth cutter 230 is configured to complement the first hole 120 or form a clearance fit with the first hole 120. Accordingly, the pilot portion 252 of the fourth cutter 230 is substantially cylindrically shaped and has a diameter substantially equal to the first diameter $D_1$ of the first hole 120. Generally, engagement between pilot portion 252 of fourth cutter 230 and the first hole 120 ensures a proper concentric orientation of the fourth cutter 230 relative to the first hole 120 before the fourth cutter 230 starts to cut material away from the workpiece 100 to form the chamfer 142.

Figure 13:
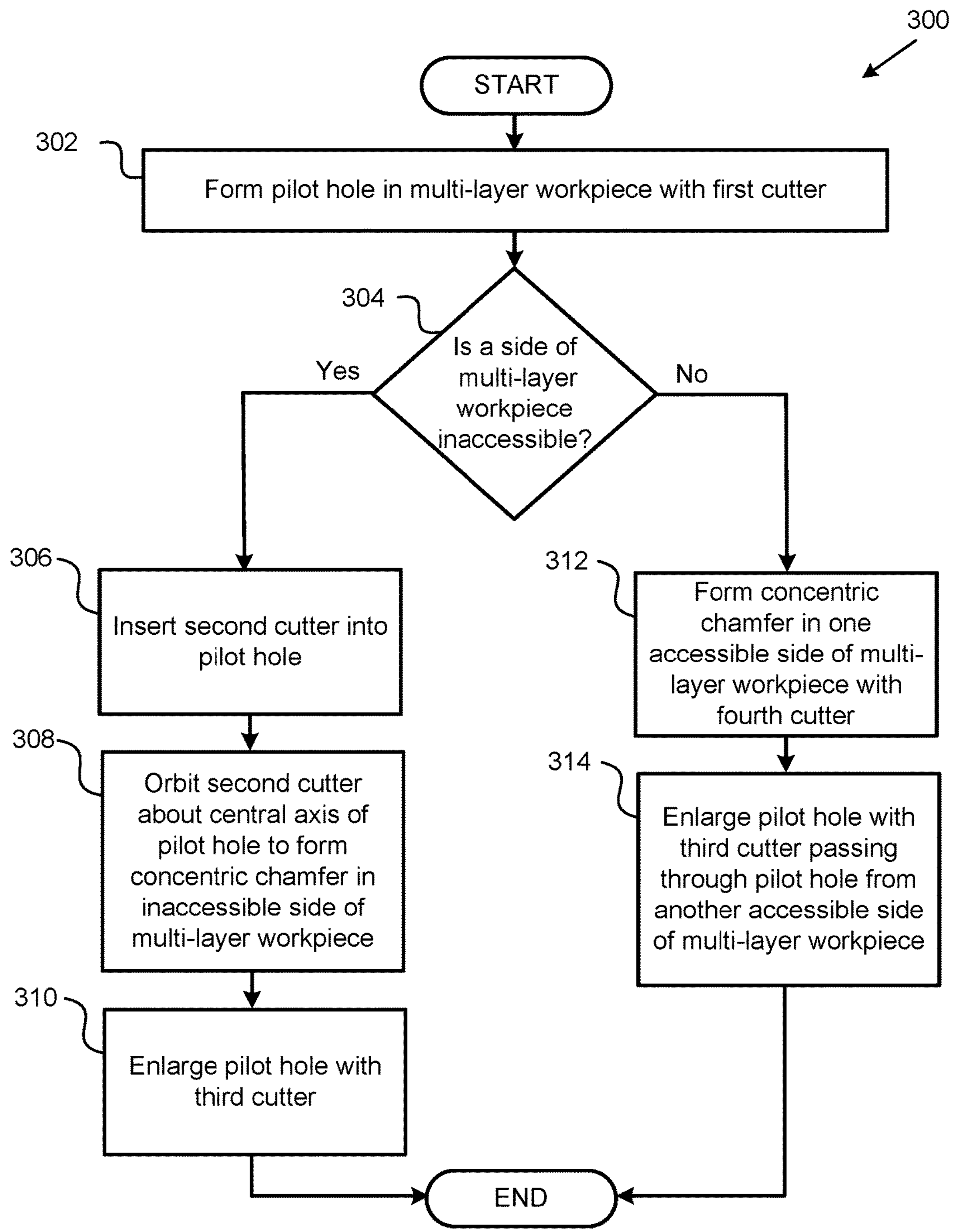
FIG. 13 is a schematic flow chart diagram illustrating a method of forming a hole in a workpiece, according to one or more embodiments of the present disclosure.

Referring now to FIG. 13, according to one embodiment, a method 300 of forming a hole in a workpiece, such as with the system 50 of the present disclosure, can include any of the method steps described above. For example, the method 300 includes forming a pilot hole in a workpiece, such as a multi-layer workpiece, with a first cutter at 302. If a side of the workpiece is not accessible, as determined at 304, the method 300 includes inserting a second cutter into the pilot hole from an accessible side of the workpiece at 306, orbiting the second cutter about a central axis of the pilot hole to form a chamfer, concentric with the pilot hole, in the inaccessible side of the workpiece at 308, and enlarging the pilot hole with a third cutter, after forming the chamfer, from the accessible side of the workpiece at 310. However, if both sides of the workpiece are accessible, as determined at 304, the method 300 includes forming a chamfer, concentric with the pilot hole, in and from an accessible side of the workpiece with a fourth cutter at 312 and enlarging the pilot hole with the third cutter, after forming the chamfer, from another or different accessible side of the workpiece at 314.

In the above description, certain terms may be used such as “up,” “down,” “upper,” “lower,” “horizontal,” “vertical,” “left,” “right,” “over,” “under” and the like. These terms are used, where applicable, to provide some clarity of description when dealing with relative relationships. But, these terms are not intended to imply absolute relationships, positions, and/or orientations. For example, with respect to an object, an “upper” surface can become a “lower” surface simply by turning the object over. Nevertheless, it is still the same object. Further, the terms “including,” “comprising,” “having,” and variations thereof mean “including but not limited to” unless expressly specified otherwise. An enumerated listing of items does not imply that any or all of the items are mutually exclusive and/or mutually inclusive, unless expressly specified otherwise. The terms “a,” “an,” and “the” also refer to “one or more” unless expressly specified otherwise. Further, the term “plurality” can be defined as “at least two.”

Additionally, instances in this specification where one element is “coupled” to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, “adjacent” does not necessarily denote contact. For example, one element can be adjacent another element without being in contact with that element.

As used herein, the phrase “at least one of”, when used with a list of items, means different combinations of one or more of the listed items may be used and only one of the items in the list may be needed. The item may be a particular object, thing, or category. In other words, “at least one of” means any combination of items or number of items may be used from the list, but not all of the items in the list may be required. For example, “at least one of item A, item B, and item C” may mean item A; item A and item B; item B; item A, item B, and item C; or item B and item C. In some cases, “at least one of item A, item B, and item C” may mean, for example, without limitation, two of item A, one of item B, and ten of item C; four of item B and seven of item C; or some other suitable combination.

Unless otherwise indicated, the terms “first,” “second,” etc. are used herein merely as labels, and are not intended to impose ordinal, positional, or hierarchical requirements on the items to which these terms refer. Moreover, reference to, e.g., a “second” item does not require or preclude the existence of, e.g., a “first” or lower-numbered item, and/or, e.g., a “third” or higher-numbered item.

As used herein, a system, apparatus, structure, article, element, component, or hardware “configured to” perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of working a workpiece having a first surface and a second surface opposite the first surface, the method comprising:

forming a first hole, having a first diameter, in the workpiece by passing a first cutter through the workpiece from the first surface to the second surface, wherein the workpiece comprises a plurality of interlaminated layers;

forming a chamfer in the second surface of the workpiece concentric with the first hole using a second cutter, the chamfer having a second diameter which is a maximum diameter of the chamfer and which is larger than the first diameter; and forming a second hole, after forming the chamfer in the second surface, having a third diameter larger than the first diameter, in the workpiece concentric with the first hole by passing a third cutter through the workpiece from the first surface to the second surface, wherein the third diameter is larger than the second diameter.

2. The method of claim 1, wherein forming the chamfer in the second surface of the workpiece comprises inserting the second cutter into the first hole from the first surface of the workpiece to the second surface of the workpiece.

3. The method of claim 2, wherein forming the chamfer in the second surface of the workpiece further comprises, with the second cutter inserted into the first hole, orbiting the second cutter about a central axis of the first hole while cutting the workpiece.

4. The method of claim 3, further comprising numerically controlling operation of the second cutter to form the chamfer in the second surface of the workpiece.

5. The method of claim 3, wherein the second cutter comprises a dovetail cutter.

6. The method of claim 5, wherein the dovetail cutter has a maximum diameter smaller than the first diameter of the first hole.

7. The method of claim 1, wherein forming the chamfer in the second surface of the workpiece comprises:

positioning the second cutter on a second side of the workpiece adjacent the second surface;

inserting a pilot portion of the second cutter into the first hole in a direction extending from the second side of the workpiece to a first side of the workpiece adjacent the first surface; and cutting the second surface of the workpiece with the second cutter and with the pilot portion of the second cutter inserted into the first hole.

8. The method of claim 7, further comprising preventing further insertion of the pilot portion of the second cutter into the first hole in the direction extending from the second side of the workpiece to the first side of the workpiece beyond a predetermined distance threshold, the predetermined distance threshold corresponding with a predetermined desired depth of the chamfer.

9. The method of claim 1, wherein:

the first cutter comprises one of a fluted drill bit or a first reamer; and the third cutter comprises a second reamer.

10. A method of working a multi-layer composite workpiece having a first surface and a second surface opposite the first surface, the method comprising:

forming a pilot hole in the multi-layer composite workpiece, the pilot hole extending from the first surface to the second surface, wherein the multi-layer composite workpiece comprises a plurality of interlaminated layers:

forming a chamfer, concentric with the pilot hole, in the second surface of the multi-layer composite workpiece; and with the chamfer formed in the second surface of the multi-layer composite workpiece, enlarging the pilot hole, wherein enlarging the pilot hole comprises enlarging the pilot hole to a diameter more than a maximum diameter of the chamfer.

11. The method of claim 10, wherein the second surface of the multi-layer-composite workpiece is substantially enclosed such that the second surface is inaccessible from a second space directly adjacent the second surface of the multi-layer composite workpiece.

12. The method of claim 11, wherein:

forming the pilot hole comprises passing a first cutter through the multi-layer composite workpiece;

forming the chamfer in the second surface of the multi-layer composite workpiece comprises:

inserting a second cutter into the pilot hole from a first space directly adjacent the first surface of the multi-layer composite workpiece; and orbiting the second cutter about a central axis of the pilot hole while cutting the second surface of the multi-layer composite workpiece; and enlarging the pilot hole comprises passing a third cutter through the pilot hole and the chamfer from the first space directly adjacent the first surface of the multi-layer composite workpiece.

13. The method of claim 10, wherein:

forming the pilot hole comprises passing a first cutter through the multi-layer composite workpiece;

forming the chamfer in the second surface of the multi-layer composite workpiece comprises inserting a second cutter into the pilot hole from a second space directly adjacent the second surface of the multi-layer composite workpiece; and enlarging the pilot hole comprises passing a third cutter through the pilot hole and the chamfer from a first space directly adjacent the first surface of the multi-layer composite workpiece.

* * * * *